(12) United States Patent
Chen et al.

(10) Patent No.: US 8,857,830 B2
(45) Date of Patent: Oct. 14, 2014

(54) FOLDING STROLLER IMPROVEMENTS

(71) Applicant: Lerado (Zhongshan) Industrial Co. Ltd., Guang Dong (CN)

(72) Inventors: Ho-Sheng Chen, Chiayi County (TW); Sheng-Po Hung, Chiayi (TW); Lung-Sheng Chen, Guang Dong (CN)

(73) Assignee: Lerado (Zhongshan) Industrial Co. Ltd., Guang Dong (CN)

( * ) Notice: Subject to any disclaimer, the term of this patent is extended or adjusted under 35 U.S.C. 154(b) by 0 days.

(21) Appl. No.: 13/766,290

(22) Filed: Feb. 13, 2013

(65) Prior Publication Data

US 2013/0154241 A1    Jun. 20, 2013

Related U.S. Application Data

(63) Continuation of application No. 13/366,911, filed on Feb. 6, 2012, now abandoned, which is a continuation of application No. 13/140,444, filed as application No. PCT/AU2009/001623 on Dec. 15, 2009, now abandoned.

(30) Foreign Application Priority Data

Dec. 19, 2008   (AU) .................................. 200806530

(51) Int. Cl.
*B62B 9/28*   (2006.01)
*B62B 9/10*   (2006.01)
*B62B 7/08*   (2006.01)
*B62B 7/00*   (2006.01)

(52) U.S. Cl.
CPC . *B62B 7/08* (2013.01); *B62B 9/104* (2013.01); *B62B 7/008* (2013.01)
USPC ..................... 280/47.41; 280/650; 280/47.35; 280/643

(58) Field of Classification Search
CPC .......... B62B 7/00; B62B 7/004; B62B 7/008; B62B 9/12; B62B 9/28; B62B 9/104
USPC .............. 280/650, 643, 648, 657, 658, 47.34, 280/47.35, 47.38, 47.41; 297/354.1, 329, 297/331, 232, 236, 239
See application file for complete search history.

(56) References Cited

U.S. PATENT DOCUMENTS 1,203,729 A * 11/1916 Hammer ........................ 297/236
1,321,009 A * 11/1919 Carlson ......................... 297/236

(Continued)

FOREIGN PATENT DOCUMENTS

CN        201511991 U      6/2010
DE        29517712 U1 *    1/1996

(Continued)

OTHER PUBLICATIONS

International Search Report and Written Opinion of the Searching Authority for Application No. PCT/AU2009/001623; dated Feb. 25, 2010.

(Continued)

*Primary Examiner* — J. Allen Shriver, II
*Assistant Examiner* — Steve Clemmons
(74) *Attorney, Agent, or Firm* — Nelson Mullins Riley & Scarborough LLP (57) ABSTRACT

The present invention relates to a stroller comprising a first passenger support and a second seat positioned behind the first passenger support, the second seat having an in use position and a stowed position, where the second seat can be moved between its in use and stowed positions and back again without need to reposition the first passenger support. An associated method for folding the stroller is also disclosed, the method for collapsing the stroller including the steps of moving the second seat from its in use position to its stowed position, and then folding the stroller. The method for erecting the stroller being the reverse of the method for collapsing this.

22 Claims, 12 Drawing Sheets

(56) References Cited

U.S. PATENT DOCUMENTS

| | | | |
|---|---|---|---|
| 2,769,482 A * | 11/1956 | Carlson | 280/47.35 |
| 4,923,208 A * | 5/1990 | Takahashi et al. | 280/642 |
| 5,338,096 A * | 8/1994 | Huang | 297/243 |
| 5,417,449 A * | 5/1995 | Shamie | 280/642 |
| 5,664,795 A | 9/1997 | Haung | |
| 5,722,682 A * | 3/1998 | Wang | 280/642 |
| 5,740,989 A * | 4/1998 | Daines | 244/118.6 |
| 5,887,935 A * | 3/1999 | Sack | 296/122 |
| 6,045,145 A * | 4/2000 | Lan | 280/47.38 |
| 6,378,892 B1 | 4/2002 | Hsia | |
| 6,676,140 B1 * | 1/2004 | Gondobintoro | 280/33.993 |
| 7,011,318 B2 * | 3/2006 | Chen | 280/47.38 |
| 7,445,229 B2 * | 11/2008 | Dotsey et al. | 280/642 |
| D587,635 S * | 3/2009 | Gower et al. | D12/129 |
| D614,540 S * | 4/2010 | Andrews et al. | D12/129 |
| 8,282,119 B1 * | 10/2012 | Caksa | 280/642 |
| 2002/0036391 A1 | 3/2002 | Sweeney et al. | |
| 2005/0023783 A1 * | 2/2005 | Chen | 280/47.38 |
| 2007/0075525 A1 * | 4/2007 | Nolan et al. | 280/642 |
| 2007/0216138 A1 * | 9/2007 | Yang | 280/652 |
| 2007/0222167 A1 * | 9/2007 | Pike et al. | 280/47.38 |
| 2009/0315300 A1 * | 12/2009 | Stiba | 280/648 |
| 2010/0072732 A1 * | 3/2010 | Offord | 280/647 |

FOREIGN PATENT DOCUMENTS

| | | | |
|---|---|---|---|
| EP | 2241492 A2 | 10/2010 | |
| JP | 10291480 A | 11/1998 | |
| WO | WO 2007049071 A2 * | 5/2007 | |
| WO | WO-2008/127128 A1 | 10/2008 | |
| WO | WO 2008127128 A1 * | 10/2008 | B62B 7/08 |
| WO | WO-2010/068975 A1 | 6/2010 | |

OTHER PUBLICATIONS

Office Action and Supplementary European Search Report for European Application No. 09832704.2 dated Aug. 20, 2012.

* cited by examiner

FOLDING STROLLER IMPROVEMENTS

CROSS-REFERENCE TO RELATED APPLICATIONS

This application is a continuation of U.S. application Ser. No. 13/366,911, filed Feb. 6, 2012, which is a continuation of U.S. application Ser. No. 13/140,444, filed Jun. 17, 2011, which was a national stage filing under 35 U.S.C. 371 of PCT/AU2009/001623, filed Dec. 15, 2009, which claims priority to Australian Application No. 2008906530, filed Dec. 19, 2008, all of which are hereby incorporated herein in its entirety by reference.

FIELD OF THE INVENTION

This invention relates generally to folding strollers of the type adapted to carry two passengers (children), where one child is positioned behind and lower than the other.

A problem with known strollers of the above described type is that they have an awkward folding action that requires significant repositioning of both seats in order to facilitate their folding to a collapsed configuration and back again.

It is an object of the present disclosure therefore to substantially ameliorate one or more of the above mentioned difficulties of known strollers of the above described type, or at least provide a stroller that is a useful alternative to known strollers.

Other objects and advantages of the present invention will become apparent from the following description, taking in connection with the accompanying drawings, wherein, by way of illustration and example, an embodiment of the present invention is disclosed.

SUMMARY OF THE INVENTION

In one aspect of this invention, there is proposed a stroller adapted to be folded between an in use configuration and a collapsed configuration, the stroller comprising a first passenger support, and a second seat adapted to be moved between an in use position and a stowed position, wherein the stroller is adapted to fold to the collapsed configuration when and only when the second seat is in the stowed position.

In a further aspect, the invention may be said to include a stroller comprising a first passenger support and a second seat, the stroller being adapted to be folded between an in use configuration and a collapsed configuration in two stages, the first stage comprising a movement of the second seat from an in use position to a stowed position, and the second stage being a folding of the stroller. Returning the stroller to the in use configuration then would require reversal of these stages.

In a further aspect, the invention may be said to include a stroller comprising a first passenger support and a second seat having an in use position and a stowed position, where the second seat can be moved between the in use and stowed positions and back again, without needing to move the first passenger support.

In one form, the in use position for the second seat is both behind and lower than the first passenger support.

When in the collapsed configuration, the stroller is not useable and is folded so as to be generally flattened and thereby consume less space. When in the in use configuration, the stroller is configured to receive and transport either one or two passengers in a manner well understood in the art.

In one form, the first passenger support is also a seat. Optionally however, the first passenger support may be a bassinet or the like.

In one form, the second seat is adapted to move to and from the stowed position with a combined sliding and rotating action.

In one form, as the second seat slides toward the first seat, it reclines away from the same. Conversely, as the second seat slides away from the first seat, it inclines toward the same.

In one form, the stroller comprises a first frame assembly supporting the first seat, and a second frame assembly supporting the second seat, the second frame assembly being pivotally connected to the first frame assembly.

In one form, the first frame assembly is comprised of an upper sub frame and a lower sub frame, where these are pivotally connected to one another via a releasably lockable hinge mechanism, for folding between the in use configuration and the collapsed configuration and back again.

In one form, the lower sub frame comprises at least one wheel assembly at or toward a lowermost end thereof. In one form, there may be two wheel assemblies, and these may be castor wheel assemblies, so as to permit steering of the stroller.

In one form, the upper sub frame of the first frame assembly supports the first seat and provides a handle at or toward an uppermost end thereof.

In one form, the second frame assembly comprises a pair of arms, where each of these arms is pivotally connected to the lower sub frame of the first frame assembly at or toward a first end thereof, and where each of these arms supports a wheel assembly at or toward a second end thereof.

In one form, the second seat is supported on a carriage frame which in turn is supported between the arms of the second frame assembly. Optionally, this carriage frame (and the second seat supported thereby) may be removably secured to the arms of the second frame assembly.

In one form, the second seat is adapted to slide along and pivot relative to this carriage frame so that it may move between its in use (i.e. inclined) and stowed (i.e. reclined) positions.

In one form, the carriage frame comprises user operable locking means which permit the second seat to be locked in at least the in use and stowed positions.

In a further aspect the invention may be said to include a method of folding the above described stroller between the in use and collapsed configurations, or visa-versa.

A stroller configured for use is collapsed by firstly releasing the carriage locking mechanism and sliding the second seat along the carriage and toward the first end of the arms, this simultaneously causing the second seat to recline to a stowed position close to the arms, the releasably lockable hinge mechanism of the first frame assembly can then be released and the lower sub frame of this folded beneath both the upper sub frame and the second frame assembly, this being the strollers collapsed configuration. The stroller can be returned to the in use configuration by reversing this process.

In this respect, before explaining at least one embodiment of the invention in detail, it is to be understood that the invention is not limited in its application to the details of construction and to the arrangements of the components set forth in the following description or illustrated in the drawing. The invention is capable of embodiments in addition to those described and of being practiced and carried out in various ways. Also, it is to be understood that the phraseology and terminology employed herein, as well as the abstract, are for the purpose of description and should not be regarded as limiting.

The accompanying drawings, which are incorporated in and constitute a part of this specification, illustrate certain embodiments of the invention, and together with the description, serve to explain the principles of the invention.

Those skilled in the art will appreciate that the conception upon which this disclosure is based may readily be utilized as a basis for designing other structures, methods, and systems for carrying out the several purposes of the present invention. It is important, therefore, to recognise that the claims should be regarded as including such equivalent constructions insofar as they do not depart from the spirit and scope of the present invention.

BRIEF DESCRIPTION OF THE DRAWINGS

For a better understanding of this invention it will now be described with respect to an exemplary embodiment which shall be described herein with the assistance of drawings wherein.

In the following description, like reference characters designate like or corresponding parts throughout the several views of the drawings.

DETAILED DESCRIPTION

Figure 1:
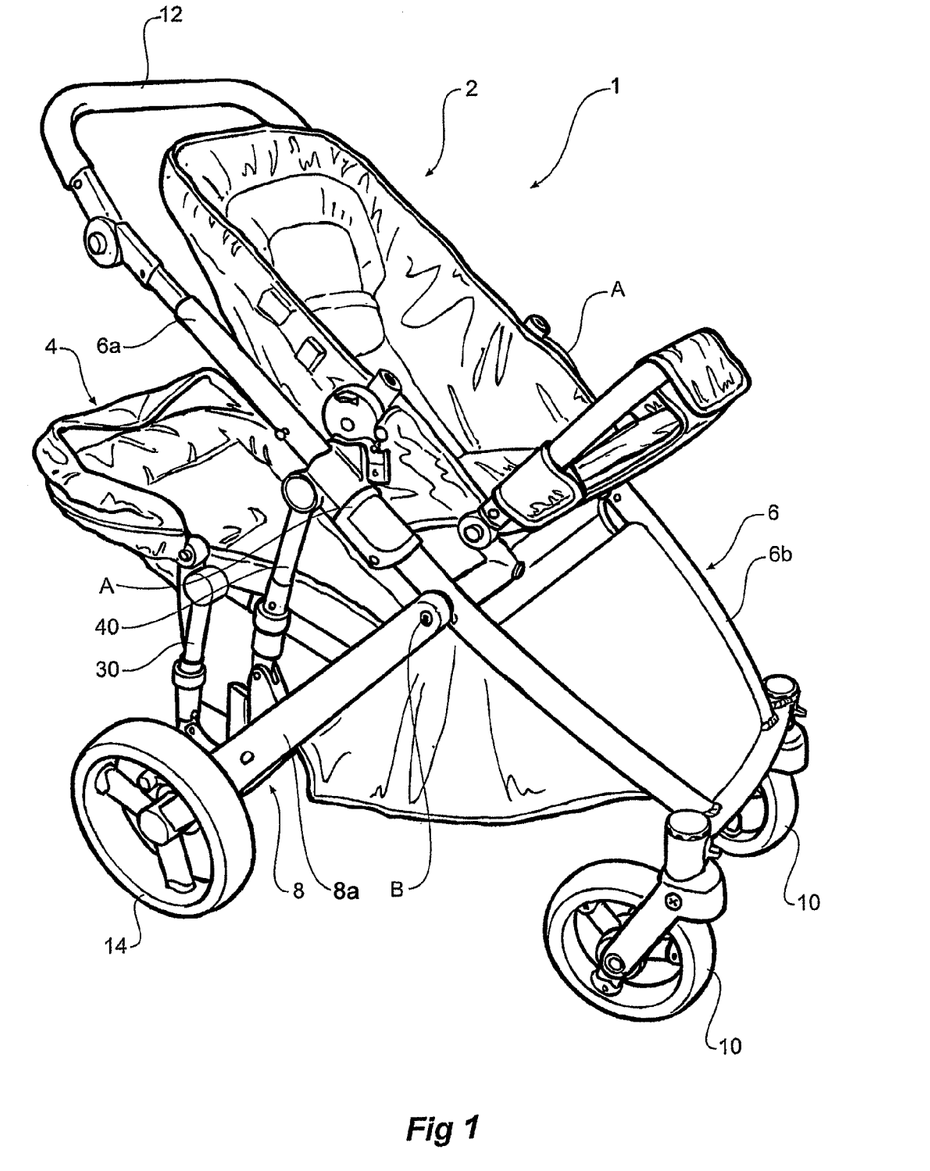
FIG. 1 is a perspective view of an exemplary stroller in its in use configuration, with the second seat fully inclined (i.e. in it's in use position)
Figure 2:
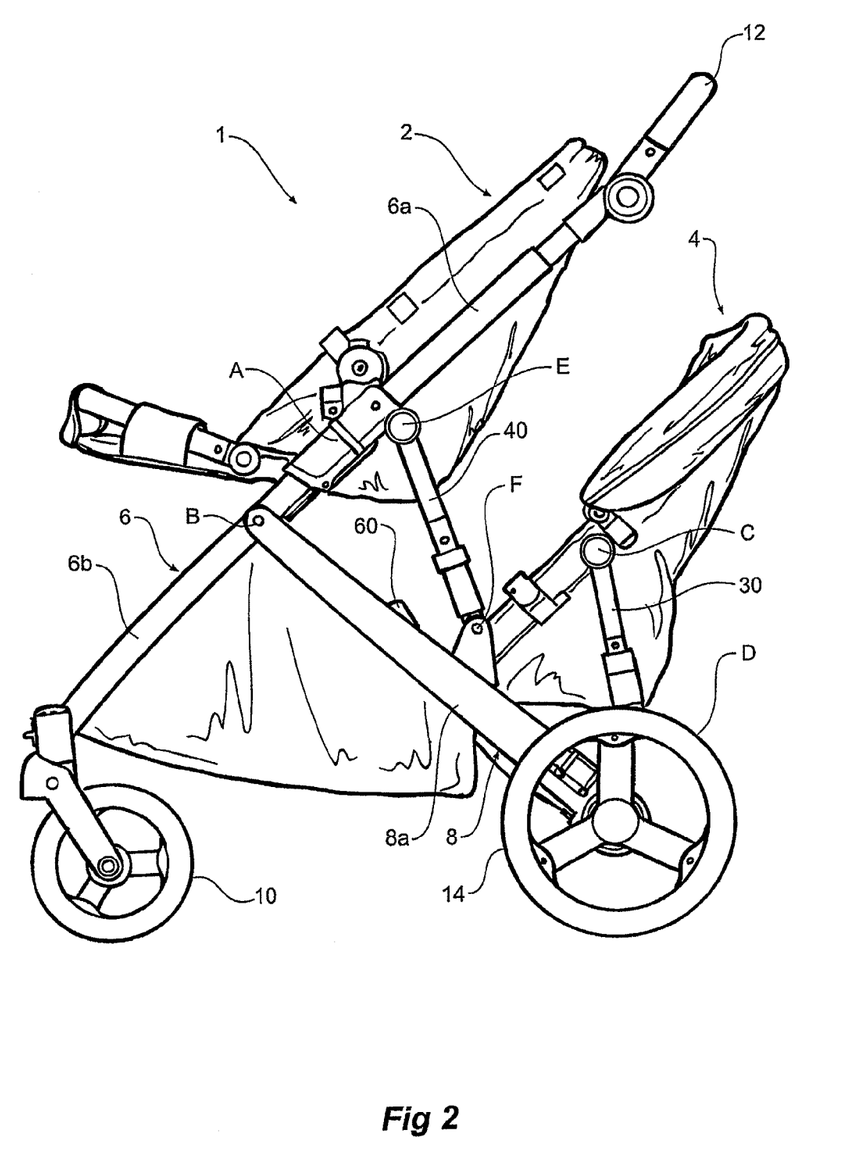
FIG. 2 is a side view of the stroller in FIG. 1, in it's in use configuration.

Referring to FIGS. 1 and 2, where there is illustrated a stroller 1 having a first seat 2 and a second seat 4 positioned behind and lower than the first seat 2.

The stroller comprises a first frame assembly 6 removably supporting the first seat 2, and a second frame assembly 8 removably supporting the second seat 4.

The first and second seats 2 and 4 are removably attached to their respective frame assemblies 6 and 8 using releasable connector fittings of a type well understood in the relevant art. Typically, these connector fittings employ spring loaded catches or pins either operated or released by buttons or levers. Also, unless otherwise stipulated, the frame assemblies referenced herein are fabricated from a tubular metal material, such as steel or aluminium.

The first seat 2 is connected to the first frame assembly 6 via an adaptor which repositions the first seat 2 upward and forward and thereby provides additional space for the second seat 4 and its occupant behind and lower than the first seat 2.

The first frame assembly 6 is comprised of an upper sub frame 6a and a lower sub frame 6b, where these are pivotally connected to one another via a releasably lockable hinge mechanism at A, so as to permit the folding of these sub frames 6a and 6b relative to each other between an in use configuration and a collapsed configuration and back again.

The lower sub frame 6b comprises one or more (a pair in this case) removable castor wheel assemblies 10 at a lowermost end thereof. In use, these castor wheel assemblies 10 permit steering of the stroller 1.

The upper sub frame 6a of the first frame assembly 6 supports the first seat 2 and comprises a handle 12 at an uppermost end thereof.

Figure 9:
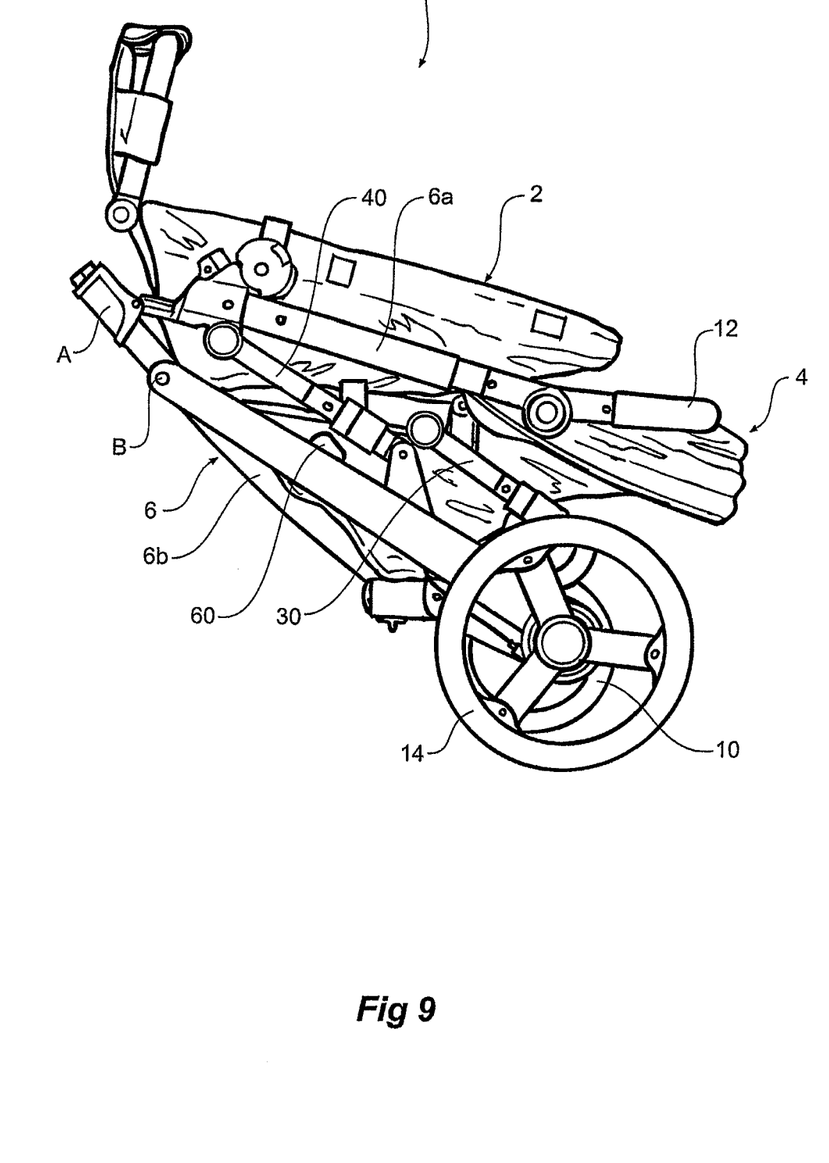

The releasably lockable hinge mechanism at A is adapted to provide user releasable locking for securing the upper and lower sub frames 6a and 6b in the in use configuration (as illustrated in FIGS. 1 and 2), or release these so that they may be folded to the collapsed configuration (as illustrated in FIG. 9). This releasably lockable hinge mechanism A will also be of a type well understood in the art. Again, these releasably lockable hinge mechanisms typically employ spring loaded catches or pins either operated or released by buttons or levers.

The second frame assembly 8 comprises a pair of arms 8a, where each of these arms 8a is pivotally connected to the lower sub frame 6b of the first frame assembly 6 at a first end thereof at point B. Each of these arms 8b supports a removable rear wheel assembly 14 at a second end thereof.

Figure 4:
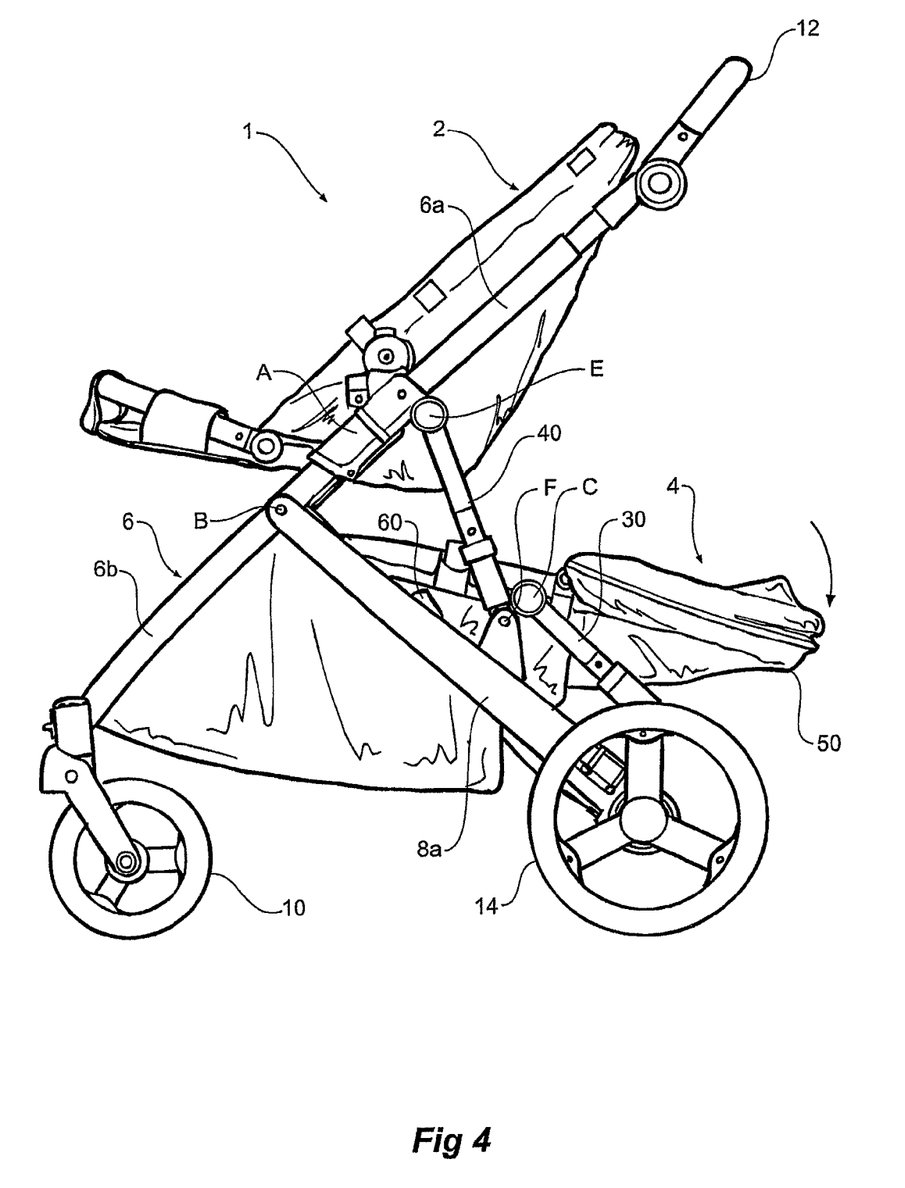
Figure 10:
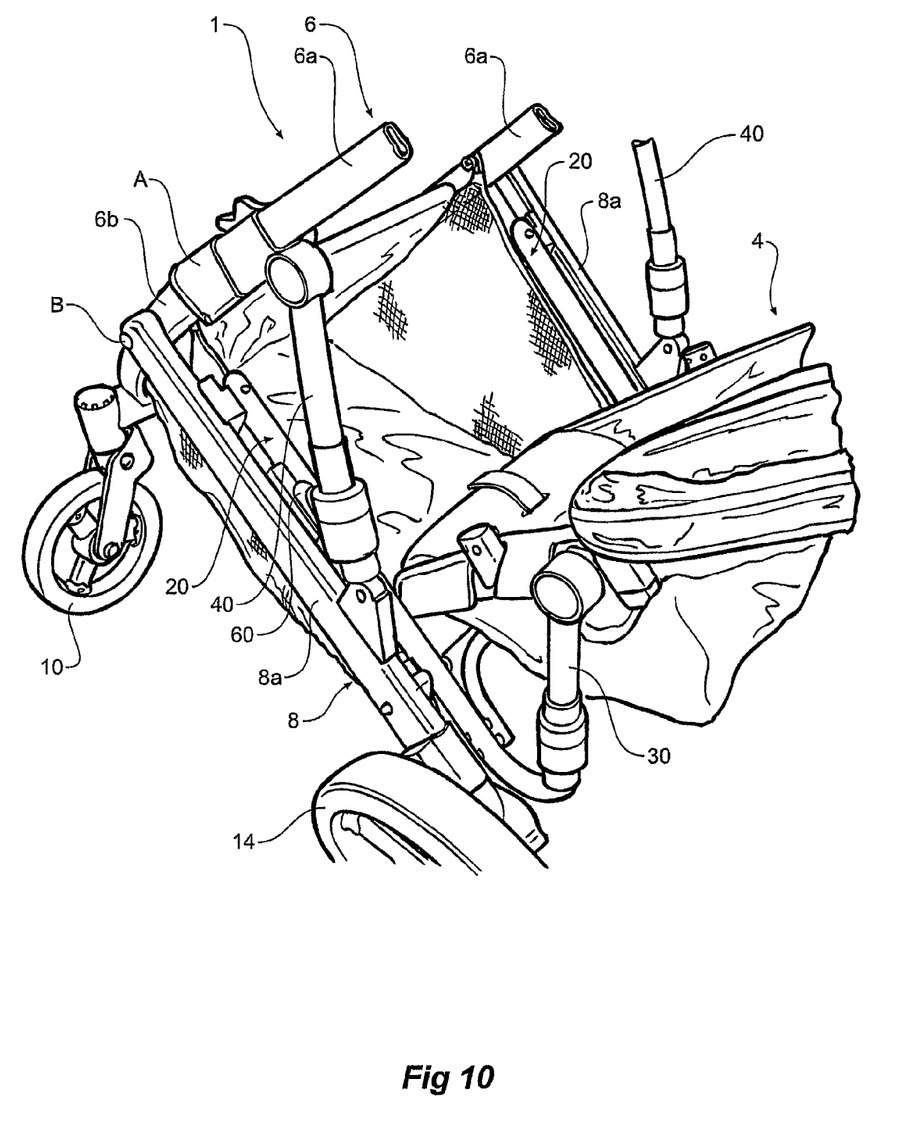
FIG. 10 is a detail view in which the first seat has been removed to permit visibility of the carriage locking means.
Figure 11:
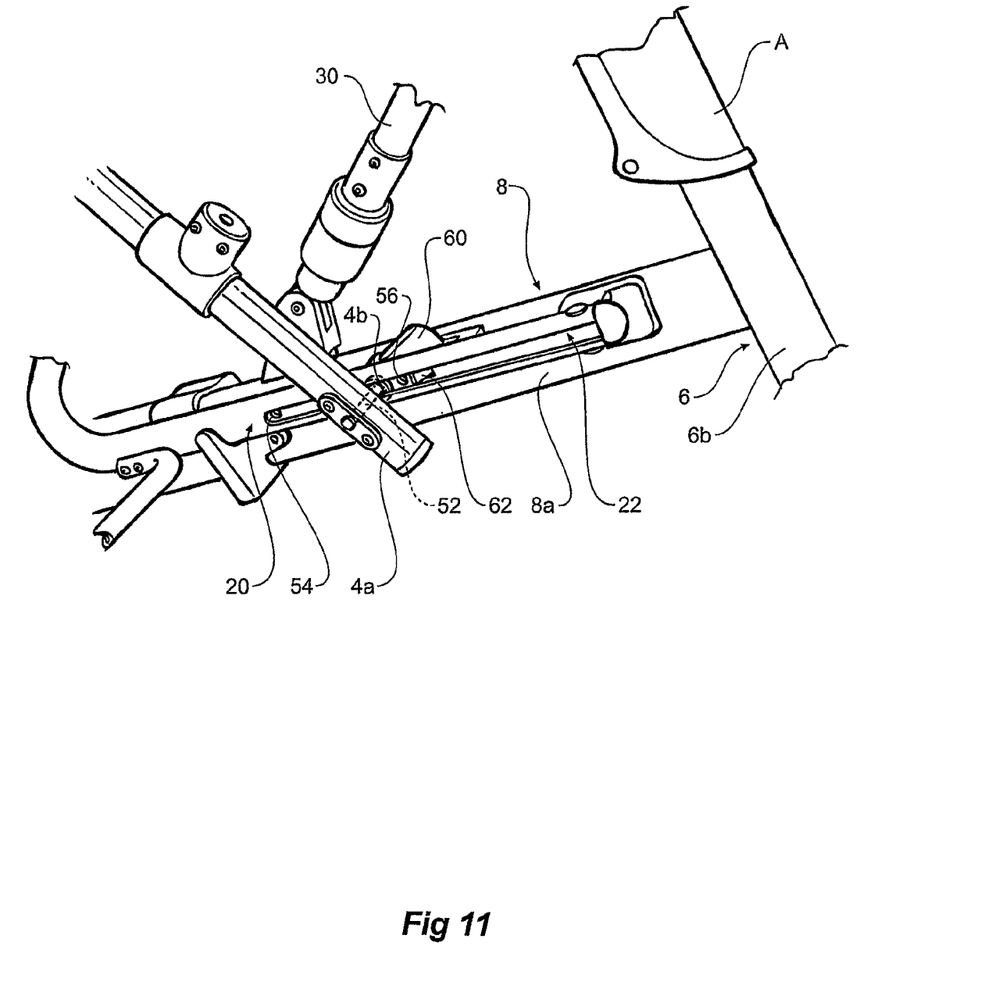
FIG. 11 is a detail view in which the seat padding and material has been removed to permit visibility of the seat frame and the carriage locking means.

Referring now to FIGS. 10 and 11, the second seat 4 is supported on a carriage frame 20 which in turn is removably supported between the arms 8a of the second frame assembly 8. The second seat 4 is adapted to slide relative to carriage frame 20 between its in use (as illustrated in FIGS. 1 and 2) and stowed (as illustrated in FIG. 4) positions.

With reference to FIG. 11 it can be seen that the second seat 4 has a pair of oppositely directed lugs 4b projecting from the frame 4a thereof at a location toward a forward edge of the seat 4; each of theses lugs 4b locates in and may slide along a track 22 running in an inner edge of the carriage frame 20.

The second seat 4 is also indirectly connected to the carriage frame 20 by a pair of struts 30, each strut 30 extending between a side of the back portion of the second seat 4 (i.e. aft of lugs 4b) and the carriage frame 20, and each strut 30 being pivotally connected to these at points C and D respectively.

Conceivably this arrangement of lugs 4b and struts 30 could be reversed so that the struts 30 are forward of the lugs 4b.

Figure 3:
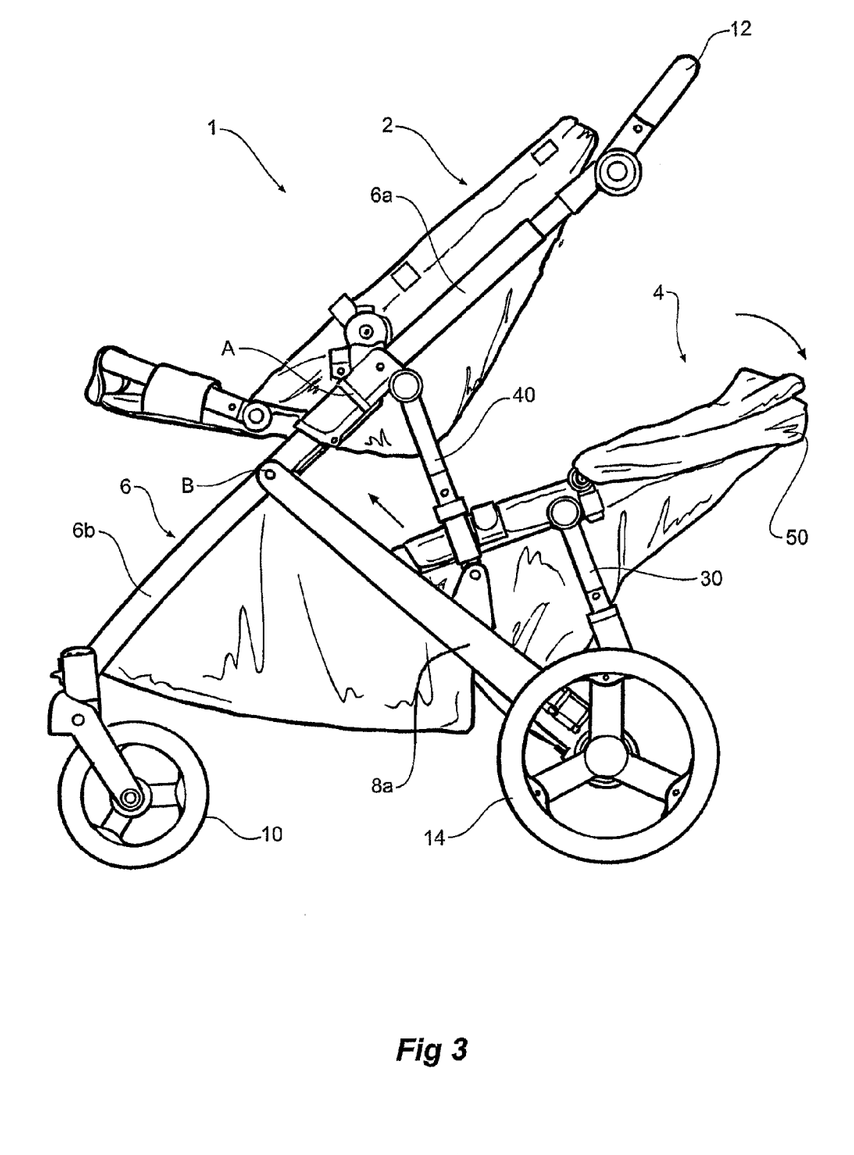
FIGS. 3 and 4 are side views of the stroller in FIGS. 1 and 2, illustrating successive stages of the second seats movement, ranging from its fully inclined position to its stowed position.

Referring now to FIGS. 3 and 4, where it can be seen that the second seat 4 is adapted to move to and from its stowed position with a combined sliding and rotating action. That is, as the second seat 4 slides toward the first seat 2 (i.e. the stowed position), it reclines away from the same. Conversely, as the second seat 4 slides away from the first seat 2 (i.e. toward the in use position), it inclines toward the first seat 2.

An advantage of this combined sliding and rotating action is that is prevents any significant rearward shift of the centre of gravity of the stroller 1, which may lead to rearward toppling of a loaded stroller. That is, the centre of gravity of the stroller 1 is maintained between the front wheel assembly 10 and rear wheel assembly 14 of the stroller 1.

Figure 12:
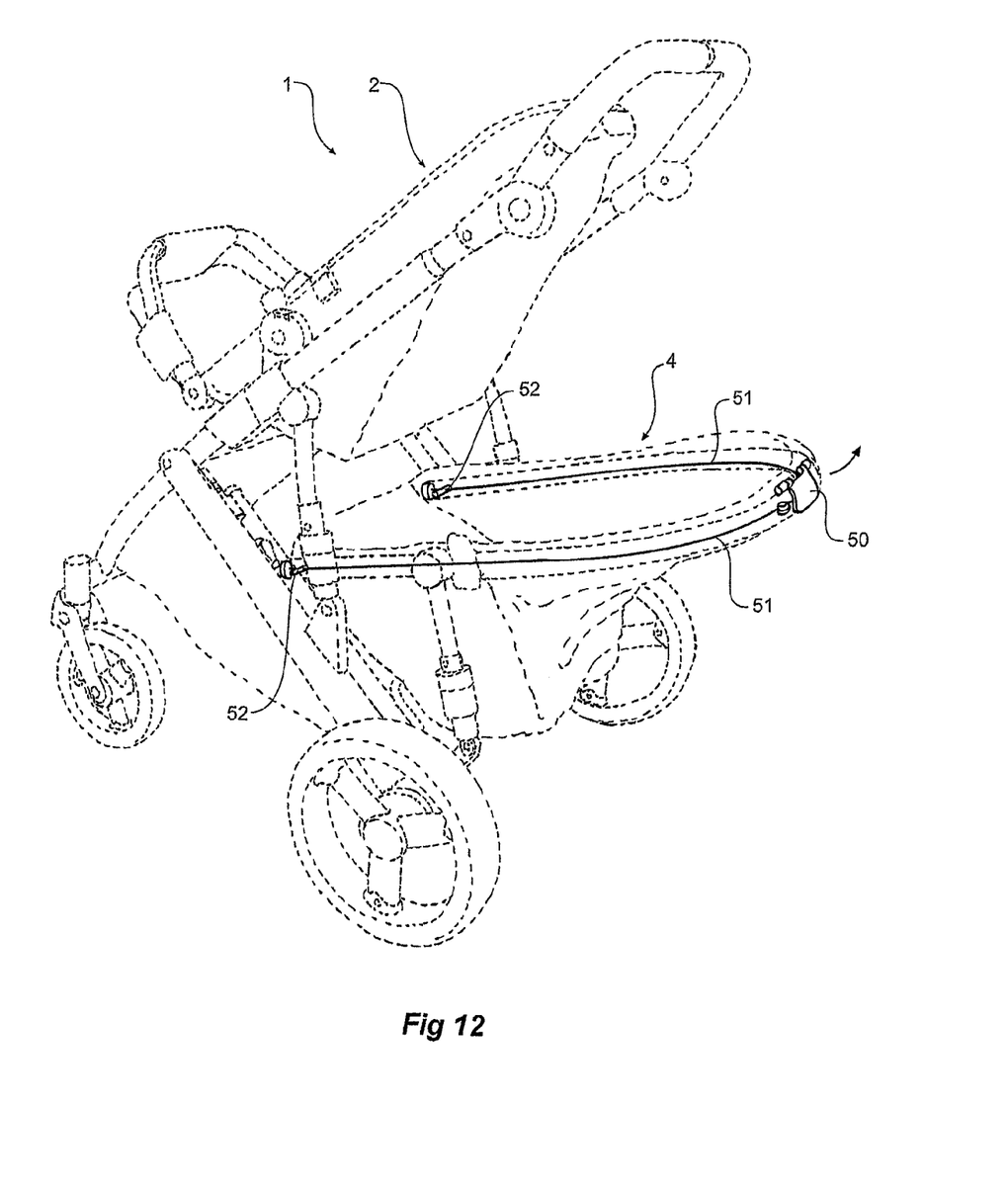
FIG. 12 is a perspective schematic of the stroller illustrating the carriage locking means.

Referring now to FIGS. 10 through 12, the carriage frame 20 comprises user operable locking means which lock the second seat 4 in at least the in use and stowed positions. This locking means operates in two stages.

A first locking or adjustment stage permits movement of the second seat 4 between an inclined position (as illustrated in FIG. 2), and a partially reclined position (as illustrated in FIG. 3) suitable for a child sleeping in the second seat 4. Further movement of the second seat 4 from this partially reclined position (as illustrated in FIG. 3) to the stowed position (as illustrated in FIG. 4) is prevented by a second locking or safety stop stage, which must be separately released before the second seat 4 can be moved from the partially reclined position (as illustrated in FIG. 3) to the stowed position (as illustrated in FIG. 4). This second safety stop then prevents the second seat 4 from being inadvertently moved toward the stowed position (as illustrated in FIG. 4) whilst a child is seated therein.

The adjustment stage is controlled by a handle 50 positioned on the upper back edge of the second seat 4. This handle 50 is connected to a wire cable 51 routed through the second seat's frame 4a to a spring loaded pin 52 that engages in one of a series of spaced apart apertures represented at 54 and 56 and located in the track 22 running in inside edge of carriage frame 20. Pulling on the handle 50 retracts the pin 52 from the aperture in which it is held captive thereby permitting the second seat 4 to slide along track 22, where releasing the handle 50 permits the pin 52 to extend and engage the next aperture that it passes.

The safety stop is controlled by a button 60 located on the carriage frame 20 itself. This button 60 is connected to a catch 62 which prevents one of the seat lugs 4b from passing thereby unless the button 60 is operated thereby removing the catch 62 from in front of the lug 4b.

A second pair of struts 40 extends between a respective side of the first frame assembly 6 and an arm 8b of the second frame assembly 8, each strut 40 being pivotally connected to these at points E and F respectively.

Figure 5:
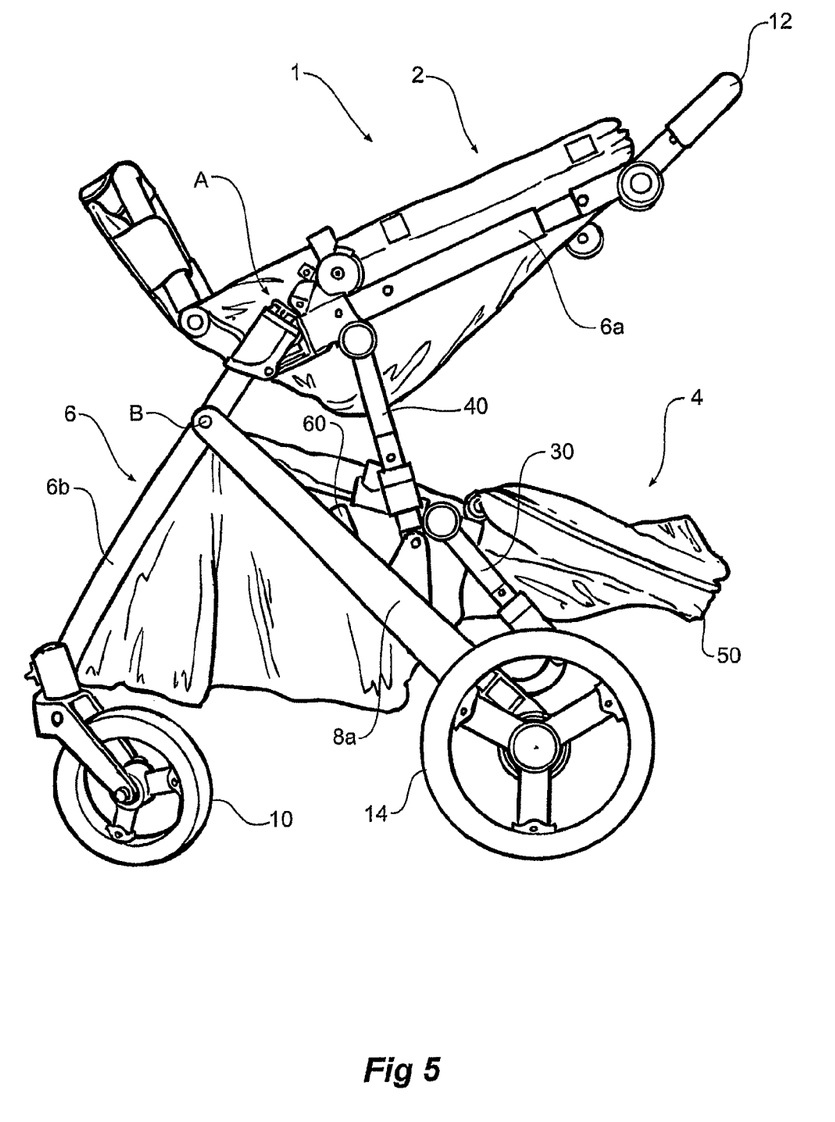
FIGS. 5 through 9 are side views of the stroller in FIGS. 1 through 4, illustrating successive stages of the strollers folding action as it is folded into its collapsed configuration.
Figure 6:
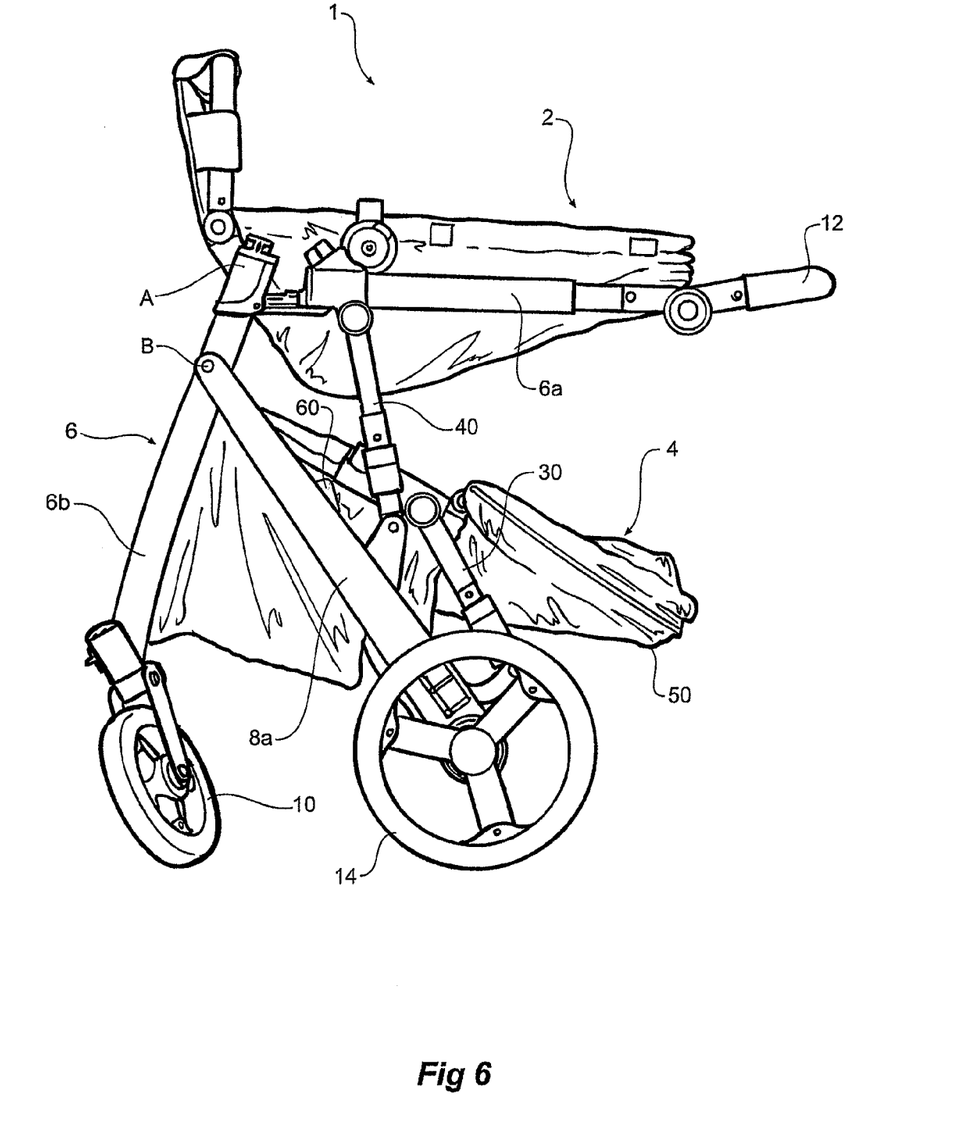
Figure 7:
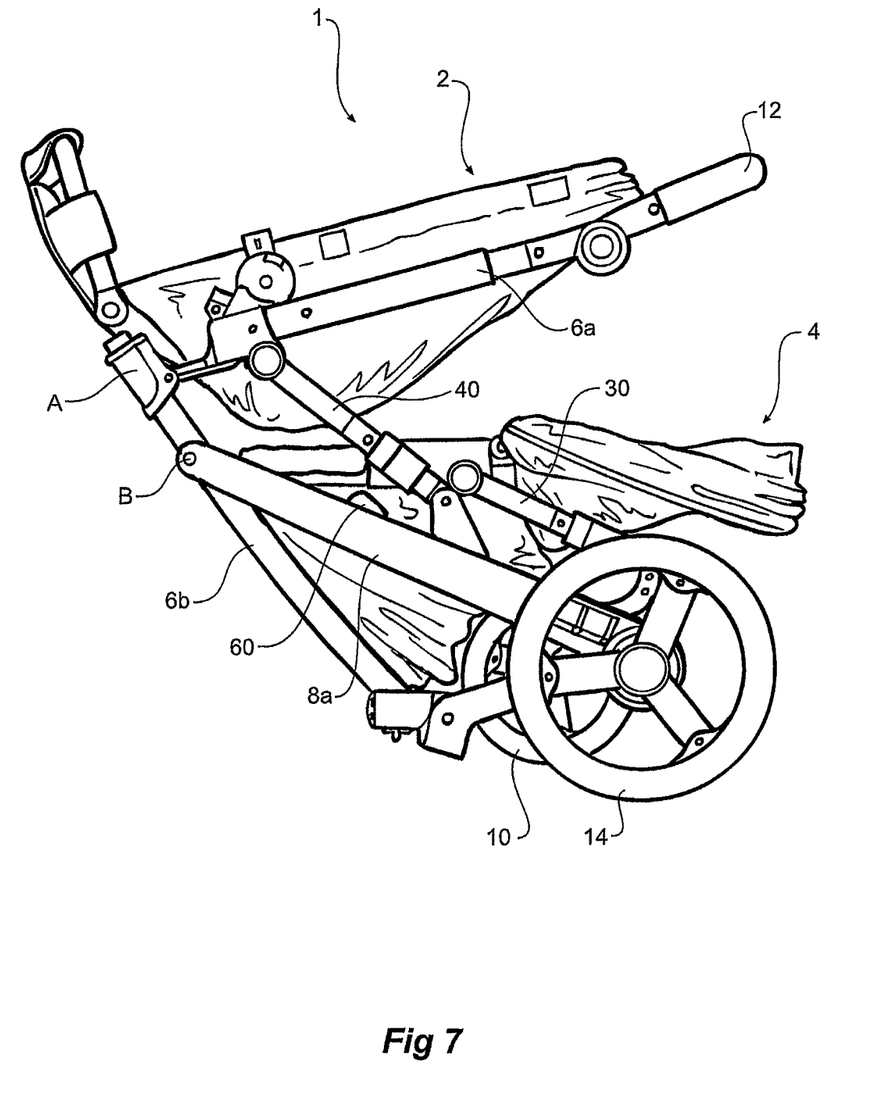
Figure 8:
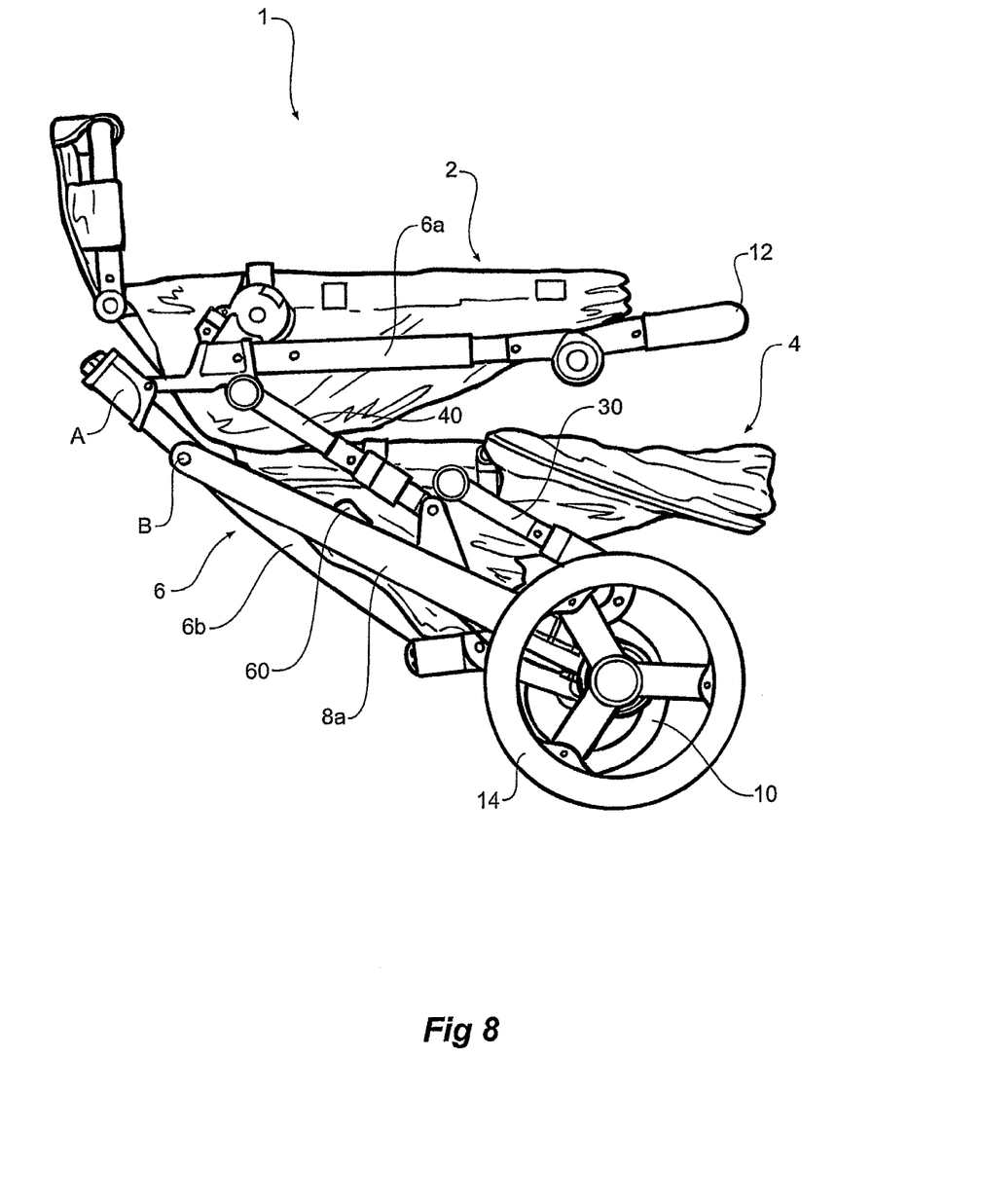

In use, a stroller 1 configured for use (as illustrated in FIG. 1) is collapsed by firstly releasing the carriage locking mechanism (by releasing the two stages of this in turn) and sliding the second seat 4 toward the first end of the arms 8a, this simultaneously causing the second seat 4 to recline to a stowed position close to the arms 8a (as illustrated in FIG. 4). The releasably lockable hinge mechanism of the first frame assembly 6 can then be released (as illustrated in FIG. 5) and the lower sub frame 6b of this folded beneath both the upper sub frame 6a and the second frame assembly 8, this being the strollers collapsed configuration (as illustrated in FIGS. 6 through 9). The stroller 1 can be returned to the in use configuration by reversing this process.

A significant advantage of the stroller 1 described herein is that only the second seat 4 (as distinct from both seats) need be positioned (by stowing this) to facilitate the folding collapse of the stroller 1.

It will be understood that the term "comprise" and any of its derivatives (e.g. comprises, comprising) as used in this specification is to be taken to be inclusive of features to which it refers, and is not meant to exclude the presence of any additional features unless otherwise stated or implied.

Although the disclosure has been herein shown and described in what is conceived to be the most practical and preferred embodiment, it is recognized that departures can be made within the scope of the invention, which is not to be limited to the details described herein but is to be accorded the full scope of ay appended claims so as to embrace any and all equivalent devices and apparatus.

The invention claimed is:

1. A stroller comprising:
   a first frame assembly configured to be folded between a collapsed configuration and an in use configuration, wherein the first frame assembly comprises:
   a support for a first passenger; and
   a forward facing seat for a second passenger, wherein the forward facing seat is supported in a position rearward of the support for the first passenger when the stroller is in the in use configuration, and wherein the forward facing seat is movable relative to a remainder of the stroller with both a reclining action and an inclining action when the stroller is in the in use configuration, wherein the forward facing seat is movable from an in use position to a stowed position via a combined forward sliding and reclining action.

2. The stroller of claim 1, wherein the first frame assembly comprises of an upper sub frame and a pair of lower sub frames, wherein the sub frame is pivotally connected to each lower sub frame via a releasably lockable hinge mechanism, for folding between the in use configuration and the collapsed configuration and back again.

3. The stroller of claim 2, wherein the lower sub frame of the pair of lower sub frames is supported on one or more castor wheel assemblies.

4. The stroller of claim 2, wherein the upper sub frame of the first frame assembly supports the first passenger support and provides a handle via which the stroller can be pushed.

5. The stroller as in claim 2, wherein the second lower sub frame comprises a pair of arms, where each of these arms is pivotally connected to the releasably lockable hinge mechanism at or toward a first end thereof, and where each of these arms carries a wheel assembly at or toward a second end thereof.

6. The stroller of claim 5, wherein the second seat is supported between the arms of the second lower sub frame.

7. The stroller as in claim 1, wherein the support for the first passenger is a seat.

8. The stroller of clam 1, wherein, in the in use position, the forward facing seat for the second passenger seat is both rearward of the lower than the support for the first passenger.

9. The stroller as in claim 1, wherein the support for the first passenger is a bassinet.

10. The stroller of claim 1, wherein the forward facing seat is movable between the in use position and the stowed position such that collapse of the first frame assembly is unimpeded by the stowed forward facing seat.

11. The stroller of claim 10, wherein the forward facing seat is movable from the stowed position to the in use position by inclining.

12. The stroller of claim 10, wherein the stroller is adapted to be collapsed in two stages, wherein a first stage comprises a movement of the forward facing seat from the in use position to the stowed position, and a second stage comprises a folding of the first frame assembly.

13. The stroller of claim 1, wherein the forward facing seat is movable through a combined forward movement and reclining action and a combined rearward movement and inclining action.

14. The stroller of claim 13, wherein the forward facing seat is movable from the stowed position to the in use position via a combined rearward sliding and inclining action.

15. The stroller of claim 1, wherein the forward facing seat is part of an assembly that is detachable from the first frame assembly.

16. A stroller comprising:
    a first frame assembly configured to be folded between a collapsed configuration and an in use configuration, wherein the first frame assembly comprises:
    a support for a first passenger; and
    a forward facing seat for a second passenger, wherein the forward facing seat is supported in a position rearward of the support for the first passenger when the stroller is in the in use configuration, and wherein the forward facing seat is movable relative to a remainder of the stroller with both a reclining action and an inclining action when the stroller is in the in use configuration, wherein the forward facing seat is movable between an in use position and a stowed position such that collapse of the first frame assembly is unimpeded by the stowed forward facing seat, and wherein the forward facing seat is movable from the in use position to the stowed position by reclining.

17. A stroller comprising:
a first frame assembly configured to be folded between a collapsed configuration and an in use configuration, wherein the first frame assembly comprises:
a support for a first passenger; and
a forward facing seat for a second passenger, wherein the forward facing seat is supported in a position rearward of the support for the first passenger when the stroller is in the in use configuration, and wherein the forward facing seat is movable relative to a remainder of the stroller with both a reclining action and an inclining action when the stroller is in the in use configuration, wherein the forward facing seat is movable between an in use position and a stowed position such that collapse of the first frame assembly is unimpeded by the stowed forward facing seat, and wherein the forward facing seat is movable from the stowed position to the in use position by inclining.

18. A stroller comprising:
a first frame assembly configured to be folded between a collapsed configuration and an in use configuration, wherein the first frame assembly comprises:
a support for a first passenger; and
a forward facing seat for a second passenger, wherein the forward facing seat is supported in a position rearward of the support for the first passenger when the stroller is in the in use configuration, and wherein the forward facing seat is movable relative to a remainder of the stroller with both a reclining action and an inclining action when the stroller is in the in use configuration, wherein the forward facing seat is movable through a combined forward movement and reclining action and a combined rearward movement and inclining action, and wherein the forward facing seat is movable from the stowed position to the in use position via a combined rearward sliding and inclining action.

19. A method of folding a stroller from an in use configuration to a collapsed configuration, the stroller comprising a first frame assembly adapted to be folded between the collapsed configuration and the in-use configuration, wherein the first frame assembly comprises a support for a first passenger and a forward facing seat for a second passenger, wherein the forward facing seat is supported in a position rearward of the support for the first passenger when the stroller is in the in-use configuration, and wherein the forward facing seat is movable relative to a remainder of the stroller with both a reclining action and an inclining action when the stroller is in the in-use configuration, wherein the forward facing seat is movable from an in use position to a stowed position via a combined forward sliding and reclining action, the method comprising:
moving the forward facing seat for the second passenger from the in use position to the stowed position, and
folding the stroller.

20. The method of claim 19, wherein the forward facing seat for the second passenger can be moved between the in use position and the stowed position and back again without need to reposition or remove the support for the first passenger.

21. A method of unfolding a stroller from a collapsed configuration to an in use configuration, the stroller comprising a first frame assembly adapted to be folded between the collapsed configuration and the in-use configuration, wherein the first frame assembly comprises a support for a first passenger and a forward facing seat for a second passenger, wherein the forward facing seat is supported in a position rearward of the support for the first passenger when the stroller is in the in-use configuration, and wherein the forward facing seat is movable relative to a remainder of the stroller with both a reclining action and an inclining action when the stroller is in the in-use configuration, wherein the forward facing seat is movable from a stowed position to an in use position via a combined rearward sliding and inclining action, the method comprising:
unfolding the stroller, and
moving the forward facing seat for the second passenger from the stowed position to the in use position.

22. The method of claim 21, wherein the forward facing seat for the second passenger can be moved between the stowed position and the in use position and back again without need to reposition or remove the support for the first passenger.

* * * * *

UNITED STATES PATENT AND TRADEMARK OFFICE
CERTIFICATE OF CORRECTION

| | | |
|---|---|---|
| PATENT NO. | : 8,857,830 B2 | Page 1 of 1 |
| APPLICATION NO. | : 13/766290 | |
| DATED | : October 14, 2014 | |
| INVENTOR(S) | : Ho-Sheng Chen, Sheng-Po Hung and Lung-Sheng Chen | |

It is certified that error appears in the above-identified patent and that said Letters Patent is hereby corrected as shown below:

Title Page: Item (30), "Dec. 19, 2008 (AU).......200806530" should read --Dec. 19, 2008 (AU).......2008906530--.

In the Claims

Column 6, Claim No. 2, Line 5, "comprises of an upper sub frame and a pair of lower sub" should read --comprises an upper sub frame and a pair of lower sub--.

Column 6, Claim No. 3, Line 10, "The stroller of claim 2, wherein the lower sub frame of" should read --The stroller of claim 2, wherein a first lower sub frame of--.

Column 6, Claim No. 5, Line 17, "frame comprises a pair of arms, where each of these arms is" should read --frame comprises a pair of arms, where each of the arms is--.

Column 6, Claim No. 6, Line 22, "The stroller of claim 5, wherein the second seat is sup-" should read --The stroller of claim 5, wherein the forward facing seat is sup- --.

Column 6, Claim No. 8, Line 26, "The stroller of clam 1, wherein, in the in use position, the" should read --The stroller of claim 1, wherein, in the in use position, the--.

Column 6, Claim No. 8, Line 27, "forward facing seat for the second passenger seat is both" should read --forward facing seat for the second passenger is both--.

Column 6, Claim No. 8, Line 28, "rearward of the lower than the support for the first passenger" should read --rearward of and lower than the support for the first passenger--.

Signed and Sealed this
Twenty-fourth Day of February, 2015

Michelle K. Lee
*Deputy Director of the United States Patent and Trademark Office*